United States Patent [19]

Kumatani

[11] Patent Number: 4,570,767
[45] Date of Patent: Feb. 18, 1986

[54] ELECTROMAGNETIC CLUTCH/BRAKE DEVICE

[75] Inventor: Hiroshi Kumatani, Nagoya, Japan

[73] Assignee: Mitsubishi Denki Kabushiki Kaisha, Tokyo, Japan

[21] Appl. No.: 487,470

[22] Filed: Apr. 22, 1983

[30] Foreign Application Priority Data

Apr. 28, 1982 [JP] Japan .............................. 57-62381[U]

[51] Int. Cl.$^4$ ............................................. F16D 67/06
[52] U.S. Cl. ................................ 192/18 B; 192/30 V; 192/12 D; 192/70.2
[58] Field of Search ................ 192/12 D, 18 B, 30 V, 192/70.19, 70.2, 84 AA, 84 AB, 106.1; 74/573 R, 804

[56] References Cited

U.S. PATENT DOCUMENTS

| 2,233,060 | 2/1941 | Parvin | 192/12 D |
| 2,237,907 | 4/1941 | Landis | 192/12 D |
| 3,251,444 | 5/1966 | Erban | 192/18 B |
| 4,303,149 | 12/1981 | Lech | 192/70.19 |

FOREIGN PATENT DOCUMENTS

| 2461855 | 3/1981 | France | 74/573 R |
| 50-15091 | 5/1975 | Japan . | |
| 0013858 | 2/1979 | Japan | 192/12 D |
| 0123650 | 9/1979 | Japan | 192/12 D |
| 0163341 | 12/1980 | Japan | 192/12 D |
| 0008672 | of 1909 | United Kingdom | 74/573 |

Primary Examiner—Rodney H. Bonck
Assistant Examiner—Alan G. Towner
Attorney, Agent, or Firm—Oblon, Fisher, Spivak, McClelland & Maier

[57] ABSTRACT

The disclosure describes an electromagnetic clutch/brake device which prevents undesired vibration of a rotary brake mounted on an ouput shaft so as to be slidable in its axial direction. For this purpose, the rotary brake is made unbalanced in weight in a specified direction with respect to its revolution center and a driven rotary body mounted on the output shaft and subjected to rotational force from the output shaft is made unbalanced in weight in a specified direction with respect to its revolution center. The driven rotary body and the rotary brake are fitted to the output shaft so that they are in a balanced condition when the shaft is driven.

6 Claims, 4 Drawing Figures

ELECTROMAGNETIC CLUTCH/BRAKE DEVICE

BACKGROUND OF THE INVENTION

The present invention relates to an electromagnetic clutch/brake device. More particularly, it relates to a structure for preventing a rattling movement of a rotary brake of the electromagnetic clutch/brake device.

The conventional electromagnetic clutch/brake device is so constructed that a rotary brake is slidable on an output shaft by actuating electromagnetically an exciter coil to be magnetically coupled to a stationary brake whereby the output shaft is braked.

Thus, in the conventional device, the rotary brake is connected to the output shaft through a spline structure so as to be slidable in its axial direction with the result that when the output shaft is coupled to an electromagnetic clutch unit but is free from engagement with an electromagnetic braking unit and if the output shaft is subjected to substantial variations in its revolution speed, a rattling movement is caused between the rotary brake and the output shaft at the connecting portion to the spline thereby generating uncomfortable noise.

It is an object of the present invention to overcome the disadvantage of the conventional device and to provide an electromagnetic clutch/brake device for eliminating noise caused by the rattling of a rotary brake by shifting the rotary brake with respect to an output shaft so that a gap produced at the spline-connection portion is given on one side in the radial direction. More specifically, the rotary brake is so constructed as to be unbalanced in weight with respect to its center while a rotary body driven by the actuation of an electromagnetic clutch is made unbalanced in weight so as to cancel the unbalanced condition of the rotary brake thereby providing as a whole a balanced rotating condition between the rotary brake and the rotary body on the output shaft.

SUMMARY OF THE INVENTION

The foregoing and other objects of the present invention have been attained by providing an electromagnetic brake/clutch device of the present invention, which comprises a driving rotary body fitted to a rotary shaft, a driven rotary body fitted to an output shaft facing the driving rotary body, an electromagnetic clutch unit formed of the driven rotary body and an exciter coil being capable of coupling the driving rotary body electromagnetically, a rotary brake mounted on the output shaft to be rotatable therewith and being slidable in the axial direction of the output shaft, a stationary brake mounted on the output shaft facing the rotary brake and an electromagnetic braking unit formed of the stationary brake and an exciter coil for braking the rotary brake by coupling the rotary brake electromagnetically, wherein the driven rotary body and the rotary brake are respectively made unbalanced in weight with respect to the respective revolution centers and are secured to the output shaft so that they are driven in a balanced state with respect to the revolution center of the output shaft.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

In the following, the present invention will be described in details in reference to figures showing one embodiment of the present invention.

Figure 1:
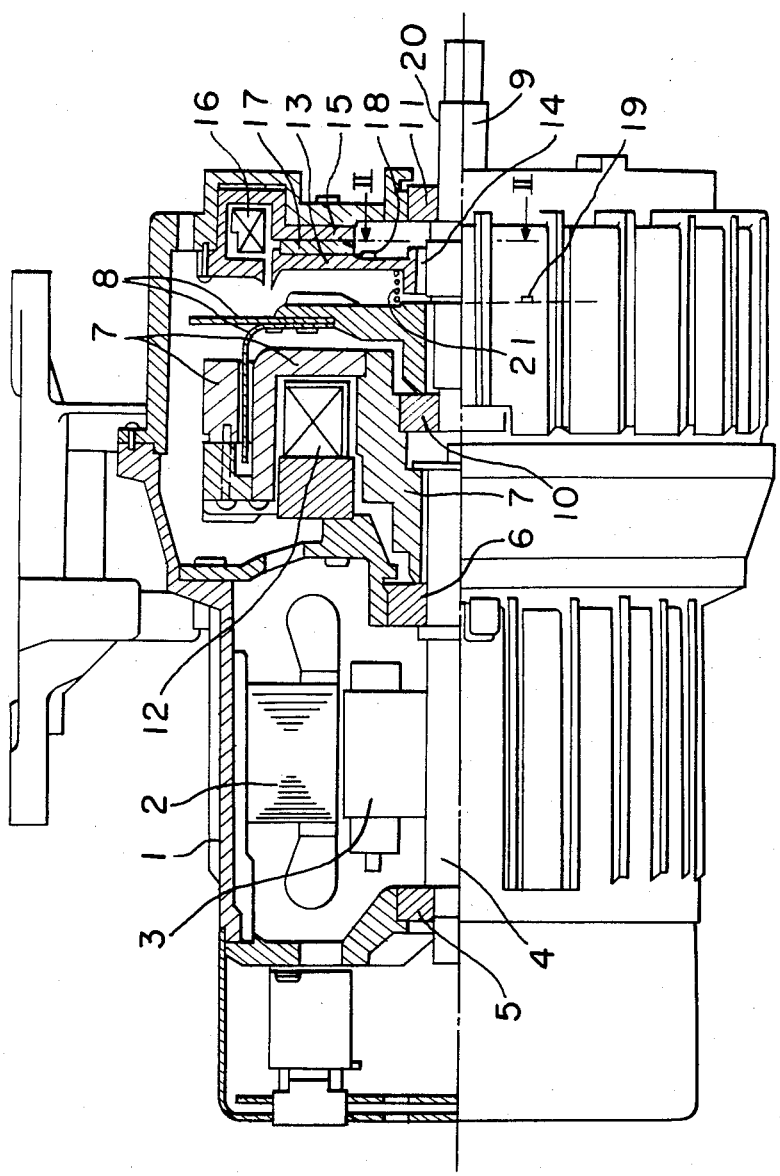
FIG. 1 is a front view showing the upper half portion longitudinally sectioned of an embodiment of the electromagnetic clutch/brake device of the present invention.

In FIG. 1, a motor is composed of an outer frame (1), a stator (2) fixed to the inside of the outer frame and a rotor (3). The rotor (3) fixedly mounted on a rotary shaft (4) which is rotatably held by a pair of bearings (5), (6) which are in turn supported by the outer frame (1). The rotor (3) is positioned inside of the stator (2) with a small gap therebetween. A driving rotary body (7) is fixed to one end of the rotary shaft (4) and a driven rotary body (8) is fixed to one end of an output shaft (9) which is held by a pair of bearings (10), (11) which are in turn supported by the outer frame (1). The driven rotary body (8) is positioned facing the driving rotary body on the rotary shaft remaining a small space therebetween.

An exciter coil (12) is secured to the outer frame (1) in the vicinity of the driving rotary body (7). An electromagnetic unit is formed of the exciter coil (12), the driving rotary body (7) and the driven rotary body (8).

Figure 2:
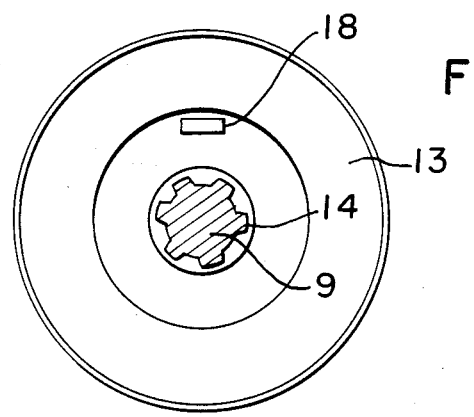
FIG. 2 is a cross sectional view taken along the line II—II of FIG. 1.
Figure 3:
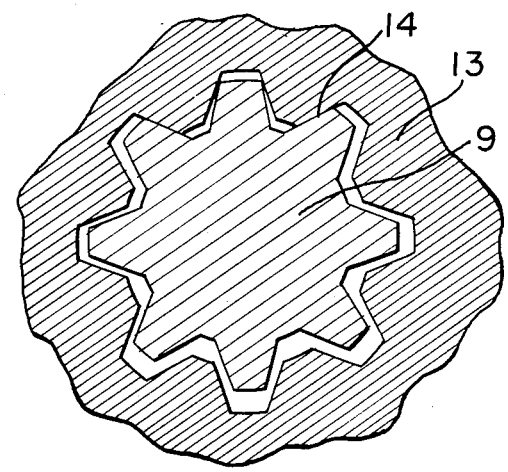
FIG. 3 is an enlarged sectional view of the control portion of FIG. 2.

A rotary brake (13) is mounted on the middle portion of the output shaft (9) in such a manner that the rotary brake (13) is connected to the output shaft (9) through a spline structure (14) to be slidable in the axial direction of the output shaft (9) as shown in FIGS. 2 and 3. A stationary brake (15) is fixed to the outer frame (1) at a position facing the rotary brake (13). An exciter coil (16) is secured to the outer frame (1) in the vicinity of the stationary brake. An electromagnetic braking unit is formed of the exciter coil (16), the rotary brake (13) and the stationary brake (15). A friction plate (17) is attached to the rotary brake (13) facing the stationary brake (15).

There is provided on the rotary brake (13) a weight (18) for imparting an unbalanced condition on it. There is also provided on the driven rotary body a weight (19) for imparting an unbalanced condition equivalent to the weight (18), at a position where the weights (19) and (18) are placed symmetrically with respect to the axial center of the output shaft (9).

The reference numeral (20) designates the other end of the output shaft to be connected to a load (not shown) and (21) designates a compression spring.

In the construction of the device of the present invention, when the rotor (3) is driven by feeding current in the windings of the stator (2), the driving rotary body (7) fixed to the rotary shaft (4) is also driven. In this circumstance, actuation of the exciter coil (12) provides a closed magnetic path through the driving rotary body (7) and the driven rotary body (8) to couple both the rotary bodies electromagnetically with the result that the output shaft (9) is driven, hence the load connected to the end (20) of the output shaft is driven. In the state that the load is driven, the electromagnetic braking unit is not actuated, i.e. in released condition and rotary brake (13) is rotated with the output shaft (9). When a slight change occurs in the load, the revolution speed of the output shaft (9) also slightly varies. This phenomenon easily occurs when the load is an industrial sewing machine. The reason is that since the sewing machine is adapted to convert a rotary movement into the vertical movement of a needle, variation of load is occurred for each one cycle and furthermore, the revolution speed of the industrial sewing machine is normally as high as 5000 rpm whereby time required for one revolution is extremely small as 0.012 second.

In the embodiment of the device of the present invention, however, centrifugal force acts on the rotary brake (13) when it rotates, because the unbalancing weight (18) is provided on the brake (13). The centrifugal force moves the rotary brake (13) in the radial direction (downward direction in FIG. 3) at a position where the rotary brake is connected to the output shaft (9) through the spline (14). Thus, even though there occurs slight change in the revolution speed of the load, no rattling movement is produced at the portion of the spline (14) for connecting the rotary brake (13) to the output shaft (9) whereby generation of uncomfortable sound is prevented.

The driven rotary body (8) of the electromagnetic clutch unit is provided with the unbalancing weight (19) at a position synmetrical to that of the rotary brake (13) with respect to the revolution center of the output shaft (9) so that the output shaft (9) is as a whole in a balanced condition when rotated and accordingly, when the rotary brake (13) is rotated, the unbalancing weight (19) suppresses generation of a great deal of vibration of the rotary brake.

In order to stop the actuation of the load under the condition described above, the exciter coil (12) is de-energized and the other exciter coil (16) is fed with current with the result that magnetic connection between the driving rotaty body (7) and the driven rotary body (8) is broken and the rotary brake (13) slides toward the stationary brake (15) to be brought into contact with the surface of the stationary brake (15) thereby effecting braking function. Thus, revolution of the output shaft (9) rapidly ceases to stop the actuation of the load.

Figure 4:
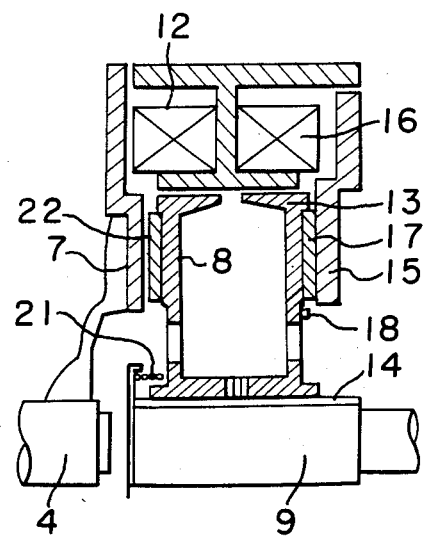
FIG. 4 is a sectional view of an important part of another embodiment of the present invention.

In the embodiment described above, the driving rotary body (7) is electromagnetically connected to the driven rotary body (8) without any mechanical contact therebetween. It is, however, possible to use an electromagnetic clutch unit constructed in such a manner that as shown in FIG. 4, the driven rotary body (8) is brought into friction-contact with the driving rotary body (7) by sliding along the output shaft (9) by the actuation of the exciter coil (12) as if the rotary brake slides toward the stationary brake (15). In this case, the driven rotary body (8) can be of the same shape as the rotary brake (13). In FIG. 4, the reference numeral (22) designates a friction plate for the driven rotary body (8).

In the embodiments described above, the weights (18), (19) are respectively provided on rotary brake (13) and the driven rotary body (8) to make each unbalanced. However, the same effect can be obtained by forming a notched or recessed portion in these members instead of attachment of the weights.

When the rotary brake (13) and the driven rotary body (8) are to be prepared by casting method, an expedient to provide unbalanced state to the cast products can be incorporated in a casting mold when prepared.

This eliminates additional working such as attachment of a weight or formation of a notched portion.

As described above, in accordance with the present invention, a rotary brake is made unbalanced in weight by a degree sufficient so that a space formed between the rotary brake and an output shaft at a position where they are slidably connected, is brought into one-side contact. Accordingly, noise caused by rattling movement of the rotary brake is prevented. Furthermore, a driven rotary body is made unbalanced in weight at a position symmetrical with the rotary brake whereby the output shaft as a whole balanced and a smooth revolution of the output shaft can be attained. Furthermore, means for imparting unbalanced condition is provided on the driven rotary body at a position where electromagnetic force of the exciter coil is not directly applied and also it is provided on the rotary brake at a position other than the friction-contacting area to the stationary brake. Therefore, electromagnetic coupling of the driving rotary body to the driven rotary body is not adversely affected by the weight means and there is no problem of braking operation caused by the rotary brake and the stationary brake.

I claim:

1. An electromagnetic clutch/brake device comprising:
   a fixed housing;
   a rotatable driving body in said housing;
   means for rotatably driving said driving body;
   a driven clutch body in said housing and facing said driving body, said driven body being fixed to an output shaft rotatable about an axis;
   electromagnetic clutch means for selectively rotatably coupling said driving and driven bodies;
   a rotary brake element mounted on said output shaft by a spline connection permitting substantially only axial relative motion of said brake element and said output shaft;
   a fixed brake element fixed to said housing and facing said rotary brake element;
   electromagnetic brake means for selectively coupling said rotary and fixed brake elements;
   means mounted on said rotary brake element for unbalancing said rotary brake element about said axis by an amount sufficient that when said rotatable brake element is rotated by said means for rotatably driving, said rotary brake element is pressed against said output shaft at said spline connection to prevent rattling; and
   means mounted on said driven body for unbalancing said driven body, said means for unbalancing said rotary brake element and said means for unbalancing said driven body being mutually symmetrically positioned with respect to said output shaft, said means for unbalancing said driven body comprising means for unbalancing said driven body by a degree sufficient such that an assembly of said rotary brake element, said output shaft and said driven body is balanced.

2. An electromagnetic clutch/brake device according to claim 1 wherein means unbalancing said driven rotary body is a weight fitted to said driven rotary body.

3. An electromagnetic clutch/brake device according to claim 1 wherein means unbalancing said rotary brake is a weight fitted to said rotary brake.

4. An electromagnetic clutch/brake device according to claim 1 wherein said driving rotary body is provided with a U-shaped portion in cross section which provides a narrow gap for receiving a part of said driven rotary body.

5. An electromagnetic clutch/brake device according to claim 1 wherein said driving rotary body is provided with an S-shaped portion in cross section which provides a first narrow gap for receiving a part of said driven rotary body and a second gap for receiving said exciter coil.

6. An electromagnetic clutch/brake device according to claim 1 wherein said driving rotary body is provided with an S-shaped portion in cross section which provides a first narrow gap for receiving the outer edge of said driven rotary body; wherein a first exciter coil is placed in a second gap of said S-shaped portion, said second gap being radially inside of said first gap; wherein said means for unbalancing said driven body is provided on said driven body at a position radially inside of said first exciter coil; wherein a second exciter coil for braking is placed at a position radially outside of the outer edge of said rotary brake element; wherein a friction plate is fitted to said rotary brake element at a position radially inside said second exciter coil and is to be brought into friction-contact with said stationary brake element and wherein said means for unbalancing said rotary brake element is provided on said rotary brake at a position radially inside said friction plate.

* * * * *